(12) United States Patent
Nathan et al.

(10) Patent No.: US 9,117,066 B2
(45) Date of Patent: Aug. 25, 2015

(54) CAMERA-BASED PORTAL CONTENT SECURITY

(71) Applicants: Eyal Nathan, Tel Aviv (IL); Yotam Kadishay, Tel Aviv (IL); Dvir Cooper, Ashqelon (IL)

(72) Inventors: Eyal Nathan, Tel Aviv (IL); Yotam Kadishay, Tel Aviv (IL); Dvir Cooper, Ashqelon (IL)

(73) Assignee: SAP Portals Israel Ltd, Ra'anana (IL)

( * ) Notice: Subject to any disclaimer, the term of this patent is extended or adjusted under 35 U.S.C. 154(b) by 244 days.

(21) Appl. No.: 13/740,858

(22) Filed: Jan. 14, 2013

(65) Prior Publication Data

US 2014/0198958 A1    Jul. 17, 2014

(51) Int. Cl.
*G06K 9/62* (2006.01)
*G06F 21/32* (2013.01)
*G06F 21/62* (2013.01)

(52) U.S. Cl.
CPC ............ *G06F 21/32* (2013.01); *G06F 21/6245* (2013.01); *G06F 2221/2149* (2013.01)

(58) Field of Classification Search
None
See application file for complete search history.

(56) References Cited

U.S. PATENT DOCUMENTS

| 5,231,674 | A   | 7/1993  | Cleveland et al. |
|-----------|-----|---------|------------------|
| 5,912,721 | A   | 6/1999  | Yamaguchi et al. |
| 6,002,427 | A   | 12/1999 | Kipust           |
| 6,552,850 | B1  | 4/2003  | Dudasik          |
| 7,185,204 | B2  | 2/2007  | Narayanaswami et al. |
| 7,437,765 | B2  | 10/2008 | Elms et al.      |
| 7,774,851 | B2  | 8/2010  | Singh et al.     |
| 7,779,462 | B2  | 8/2010  | Mathew et al.    |
| 8,086,863 | B2  | 12/2011 | Rits             |
| 8,542,879 | B1  | 9/2013  | Nechyba et al.   |
| 8,731,249 | B2  | 5/2014  | Bigioi et al.    |
| 2003/0107584 | A1 | 6/2003 | Clapper         |
| 2006/0210167 | A1* | 9/2006 | Inoue et al. ................... 382/190 |
| 2008/0272884 | A1 | 11/2008 | Lovell          |
| 2009/0183247 | A1* | 7/2009 | Kasper et al. ..................... 726/7 |
| 2010/0124363 | A1 | 5/2010 | Ek et al.       |
| 2014/0068509 | A1 | 3/2014 | Kadishay et al. |

OTHER PUBLICATIONS

Facial Recognition System, http://en.wikipedia.org/w/index.php?title=Facial_recognition_system&oldid=531987455 (Last visited Jan. 14, 2013).

* cited by examiner

*Primary Examiner* — Brian P Werner
(74) *Attorney, Agent, or Firm* — Fish & Richardson P.C.

(57) ABSTRACT

The disclosure generally describes computer-implemented methods, software, and systems for providing a camera-based portal content security mechanism for client devices. One computer-implemented method includes receiving a request for portal content from a client device, determining that the requested portal content requires a camera security operation, notifying the client device that a camera image is needed as a prerequisite to display at least part of the requested portal content, receiving the camera image from the client device, and analyzing, by operation of a computer, the received camera image for more than one viewer.

18 Claims, 7 Drawing Sheets

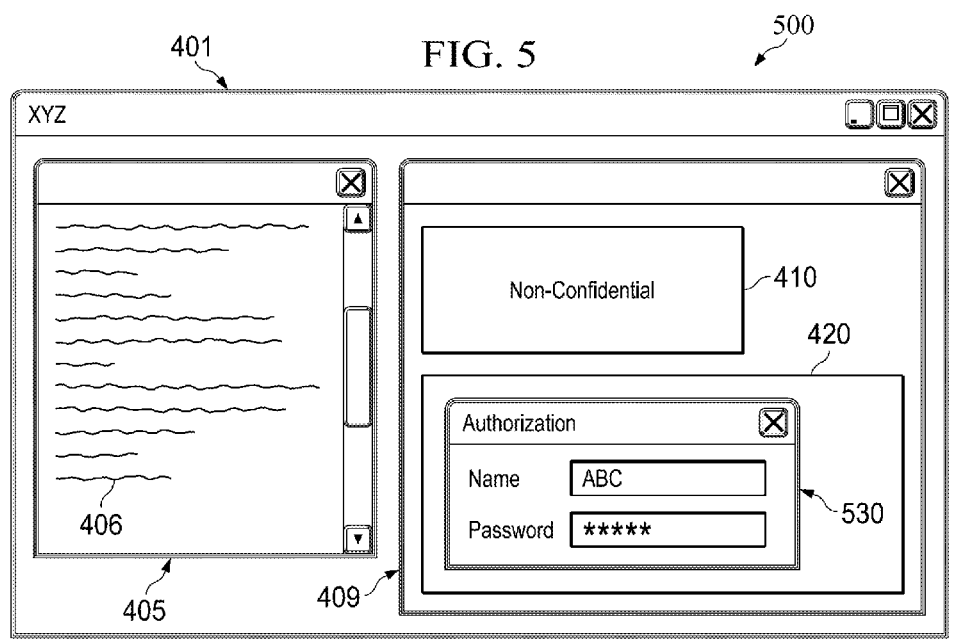

CAMERA-BASED PORTAL CONTENT SECURITY

BACKGROUND

A web portal application may use various authentication methods to restrict user access to confidential portal content on a client device. Authentication methods can include, for example, a user name/password, cookies, sessions, various codes, protocols, encryption, and/or other suitable authentication methods. Web portals, however, do not currently have an ability to restrict unauthorized viewer access to requested and/or currently viewed confidential portal content based on image data obtained by a client-device-based camera. As a result, confidential portal content could be improperly viewed on the client device by an unauthorized viewer regardless of the use of suitable authentication method by an authorized viewer.

SUMMARY

The present disclosure relates to computer-implemented methods, software, and systems for providing a camera-based portal content security mechanism for client devices. One computer-implemented method includes receiving a request for portal content from a client device, determining that the requested portal content requires a camera security operation, notifying the client device that a camera image is needed as a prerequisite to display at least part of the requested portal content, receiving the camera image from the client device, and analyzing, by operation of a computer, the received camera image for more than one viewer.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, wherein the determination that the requested portal content requires a camera security operation includes identifying an object attribute classifying the portal content as confidential, wherein the object attribute invoking the request for the camera image from the client device.

A second aspect, combinable with the general implementation, further comprising: activating the client device camera, attempting to take a camera image using the client device camera, and determining whether the camera image was obtained.

A third aspect, combinable with the general implementation, further comprising, upon a determination that more than one viewer is detected in the analyzed camera image: transmitting the requested portal content to the client device, transmitting an instruction to the client device to obscure a confidential portion of the requested portal content, and obscuring the confidential portion of the requested portal content.

A fourth aspect, combinable with the general implementation, further comprising, upon a determination that only one viewer is detected in the analyzed camera image: serving the requested portal content to the client device, and displaying the served requested portal content on the client device.

A fifth aspect, combinable with the general implementation, further comprising providing a graphical user interface to allow additional input of credentials to release the confidential portion of the requested portal content from obscuration.

A sixth aspect, combinable with the general implementation, wherein the additional input of credentials comprises at least one of a password and a fingerprint.

The subject matter described in this specification can be implemented in particular implementations so as to realize one or more of the following advantages. First, the camera-based portal content security mechanism can allow confidential portal content to be protected from unintended or unauthorized access when more than one viewer is detected. For example, certain confidential portal content may be limited for access by only one viewer. In order to view confidential portal content, the viewer must be determined to alone in terms of viewing the confidential portal content. If image data captured by a client device camera indicates that more than one viewer is attempting to view the confidential portal content (e.g., facial recognition, detection of cameras, eyeglasses, etc.), the confidential portal content can be obscured. Second, the viewer can override the obscuring action to allow more than one viewer to view the confidential portal content. Third, the identities of all viewers can be determined and logged based upon detected facial biometric data. Fourth, baseline image/biometric data can be collected and used to enhance viewer detection accuracy and efficiency. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 5 illustrates an example GUI for overriding obscuring of confidential portal content.

Like reference numbers and designations in the various drawings indicate like elements.

DETAILED DESCRIPTION

The disclosure generally describes computer-implemented methods, software, and systems for providing a camera-based portal content security mechanism for client devices. The camera-based portal content security mechanism enables an authorized single viewer using a client device accessing a portal to view portal content including non-confidential and/ or confidential data. The camera-based security mechanism also obfuscates known confidential information in displayed portal content if another viewer is detected in image data obtained by the client device camera. For example, an authorized viewer may need to access on a client device particular portal content including confidential information in a public place, such as an airport, train station, or other similar place with numerous people and/or unavoidable crowds where an unauthorized (secondary or other) viewer may inadvertently/purposely view portal content on the client device. The camera-based security mechanism can monitor the surroundings of the authorized user with one or more viewer-facing cameras. If an additional viewer or optical devices, for example a whole/partial face, eye/eyes, camera lenses, eyeglasses, etc. are detected; the camera-based security mechanism can temporarily obfuscate displayed confidential portal content in order to prevent a security breach. The authorized viewer has the option to override the obfuscated portal content, for example using a graphical user interface (GUI).

For the purposes of this disclosure, an authorized viewer may request portal content using an enterprise portal (EP). An EP is a framework for integrating information, people, and processes across organizational boundaries. An EP provides a secure unified access point, often in the form of a web-based user interface, and is designed to aggregate and personalize information through application-specific sub-portals. The EP is a de-centralized content contribution and content management system, which keeps the information always updated. With only a web browser, EP users can begin work once they have been authenticated in the EP which offers a single point of access to information, enterprise applications, and services both inside and outside an organization. EPs may present information from diverse sources on mobile or other devices in a unified and structured way, and provide additional services, such as dashboards, an internal search engine, e-mail, news, navigation tools, and various other features. EPs are often used by enterprises for providing their employees, customers, and possibly additional users with a consistent look and feel, and access control and procedures for multiple applications, which otherwise would have been separate entities altogether.

Figure 1:
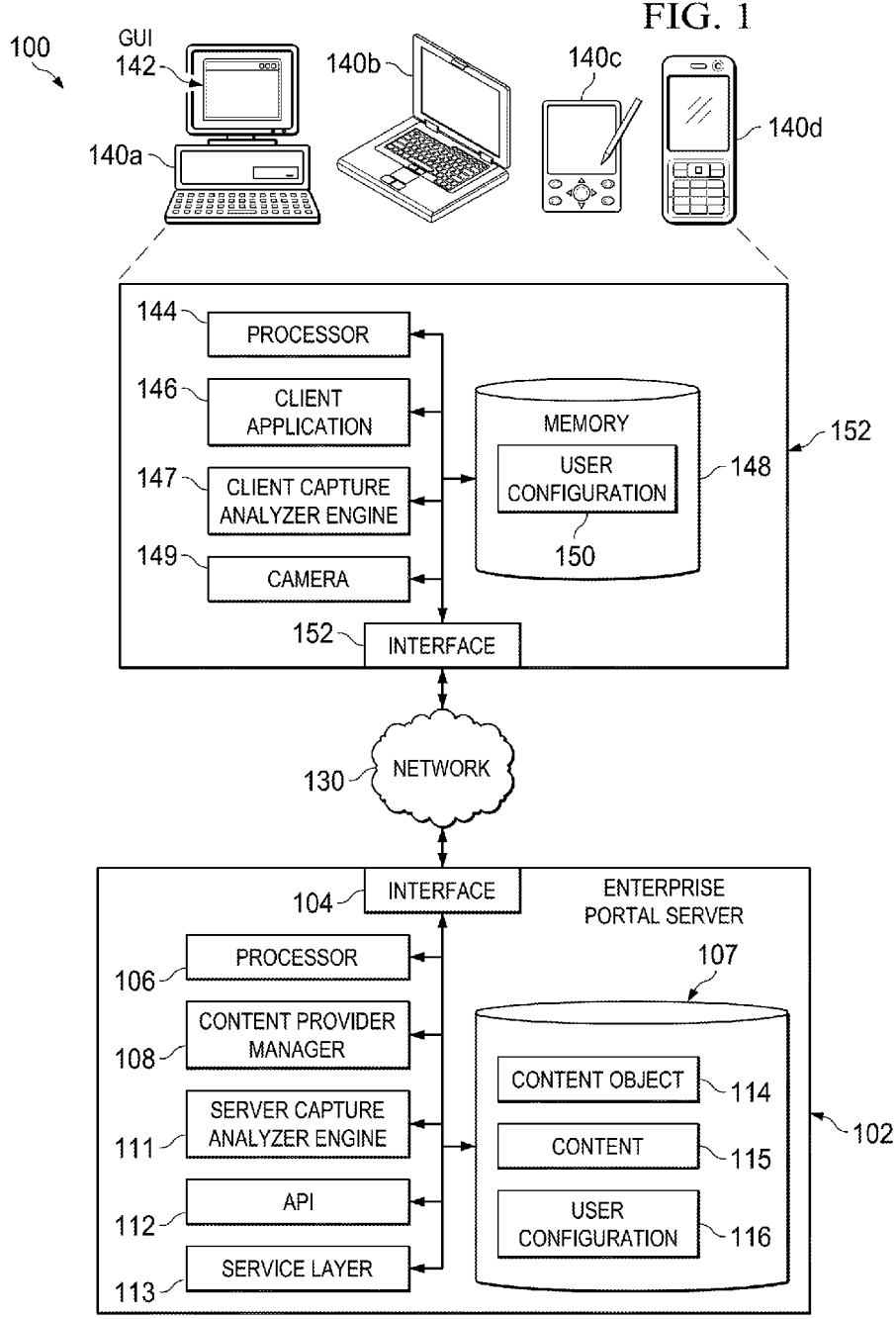
FIG. 1 is a block diagram illustrating an example distributed computing system for providing a camera-based portal content security mechanism for client devices.

FIG. 1 is a block diagram illustrating an example distributed computing system 100 for providing a camera-based portal content security mechanism for client devices. The illustrated example distributed computing system 100 includes or is communicably coupled with an EP server (EPS) 102 and a client 140 (described below) that communicate across a network 130 (described below).

At a high level, the EPS 102 is an electronic computing device operable to receive, transmit, process, store, or manage data and information associated with the example distributed computing system 100. Generally, the EPS 102 allows users to view, compose, modify, delete, and deploy enterprise portal pages. Specifically, the described computer-implemented methods, software, and systems provide functionality for providing a camera-based portal content security for client devices using one or more client-device cameras and a GUI providing an EP user with an efficient, user-friendly, and secure presentation of data provided by or communicated within the example distributed computing system 100.

The EPS 102 is responsible for receiving application requests, for example EP content requests, from one or more client applications 146 (described below) associated with a particular client 140 of the example distributed computing system 100 and responding to the received requests by processing the received EP content requests in a content provider manager 108 (described below), and sending an appropriate response from the content provider manager 108 back to the requesting client application 146. In addition to requests from the client 140, requests associated with the content provider manager 108 may also be sent from internal users, external or third-party customers, other automated applications, as well as any other appropriate entities, individuals, systems, or computers. According to one implementation, the EPS 102 may also include or be communicably coupled with an e-mail server, a web server, a caching server, a streaming data server, and/or other suitable server.

The EPS 102 contains a content provider manager 108, and a server capture analyzer engine (SCAE) 111 At least a portion of the content provider manager 108, and the SCAE 111 is executed using requests/responses sent from/to a client 140 within and communicably coupled to the illustrated example distributed computing system 100 using network 130. In some implementations, requests/responses can be sent directly to EPS 102 from a user accessing EPS 102 directly. In some implementations, the EPS 102 may store a plurality of various content provider managers 108 and SCAEs 111. In some implementations, the EPS 102 may comprise a web server, where one or more of the components of EPS 102 represent web-based applications accessed and executed by the client 140 using the network 130 or directly at the EPS 102 to perform the programmed tasks or operations of the various components of the EPS 102.

In some implementations, any and/or all of components of the EPS 102, both hardware and/or software, may interface with each other and/or an interface 104 (described below) using an application programming interface (API) 112 and/or a service layer 113. The API 112 may include specifications for routines, data structures, and object classes. The API 112 may be either computer language independent or dependent and refer to a complete interface, a single function, or even a set of APIs. The service layer 113 provides software services to the example distributed computing system 100. The functionality of the EPS 102 may be accessible for all service consumers using this service layer. Software services, such as provide reusable, defined business functionalities through a defined interface. For example, the interface may be software written in JAVA, C++, or other suitable language providing data in extensible markup language (XML) format or other suitable format.

While illustrated as an integrated component of the EPS 102 in the example distributed computing system 100, alternative implementations may illustrate the API 112 and/or service layer 113 as a stand-alone component in relation to other components of the example distributed computing system 100. Moreover, any or all parts of the API 112 and/or service layer 113 may be implemented as child or sub-modules of another software module, enterprise application, or hardware module without departing from the scope of this disclosure.

The EPS 102 includes an interface 104. Although illustrated as a single interface 104 in FIG. 1, two or more interfaces 104 may be used according to particular needs, desires, or particular implementations of the example distributed computing system 100. The interface 104 is used by the EPS 102 for communicating with other systems in a distributed environment—including within the example distributed computing system 100—connected to the network 130; for example, the client 140 as well as other systems (not illustrated) communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The EPS 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the EPS 102. Specifically, the processor 106 executes the functionality required to provide camera-based portal content security for client devices.

The EPS 102 also includes a memory 107 that holds data for the enterprise server 102. Although illustrated as a single memory 107 in FIG. 1, two or more memories may be used according to particular needs, desires, or particular implementations of the example distributed computing system 100. While memory 107 is illustrated as an integral component of the EPS 102, in alternative implementations, memory 107 can be external to the EPS 102 and/or the example distributed computing system 100. In some implementations, the memory 107, i.e., the content repository for the ERP that holds the description and/or data for all objects in the EPS 102, includes one or more instances of a content object 114, content 115, and a user configuration 116.

The content object 114 can be considered a representation of a business/non-business entity, such as an employee, an employee list, a sales order, an invoice, a financial report, etc. The content object 114 may encompass both functions, for example in the form of methods, and data, such as one or more properties and/or associated content (described below). For example, content objects 114 may reduce system complexity by reducing a system into smaller units. The implementation details of content objects 114 are typically hidden from a non-development user and may be accessed through the defined functions and encapsulated data. Content objects 114 also form a point of entry of the functions and data of a system and enable the system to easily share, communicate, display, or otherwise operate with other systems. A content object 114 may also be considered the target of a request for data, for example a navigation node in an EP, a web page, or the final destination of a navigation action, etc. and may contain the view to be displayed when the content object 114 is accessed. In some implementations, the content object 114 can control the location of a selected view, personalized views for a specific EP user, and dynamic views. In some implementations, metadata (not illustrated) may be used to determine the context of a particular displayed view and/or content object 114.

In some implementations, the content object 114 may include properties indicating confidentiality of the object and/or associated content. Some confidential content objects may be managed by the content provider manager 108 and/or the SCAE 111 (e.g., granting or denying access to one or more content objects). In some implementations, the existence of a confidentiality property is used to determine whether a camera associated with a client device must be used to view properties and/or content associated with a content object. In other implementations, more than one property, for example a confidentiality property and a camera required property can be used to determine that the camera associated with a client device must be used to view properties and/or content associated with the content object.

The content 115 is encountered as part of the user experience when accessing a content object 114 within an EP. The content 115 may include, among other things: text, images, sounds, videos, animations, and/or the like. While illustrated as integrated with memory 107 of the EPS 102 in the example distributed computing system 100, in alternative implementations, the content 115 can be external to the EPS 102 and/or the example distributed computing system 100, for example associated with external content providers (not illustrated), or can be internal to the EPS 102, for example stored within the content object 114 itself. The content 115 may further include data, entries, items, or general information that can be defined as confidential. Some confidential content may be managed by the content provider manager 108 and/or the SCAE 111 (e.g., granting or denying access to content). In some implementations, content 115 can contain properties apart from an associated content object 114 indicating the confidential nature of the content 115 and/or whether a camera-based portal content security mechanism is required to view the content 115.

The user configuration 116 is data associated with an EP/EPS 102 user. The user configuration 116 data may include, for example, the EP/EPS 102 user's reference image data such as facial recognition nodal points) and/or other biometric data for use with image processing (such as photographs or videos of the user in different view angles and in different surroundings). In other implementations, the user configuration data can include EP/EPS 102 username, department, position, salary, hire date, a role, system password, contact information, location, locale, and other suitable data. The user's reference image data may be used in the SCAE 111 for analyzing accessibility based on client device camera captured information. In some implementations, location is a dynamic property of a content object 114 that can be extracted from a location-enabled client device, for example a mobile telephone, computer, etc., and could change while the location-enabled client device is traveling. In some implementations, the location can be used to define whether image data is required for the viewing of EP content on a client device. In some implementations, the user configuration 116 can be used by the SCAE 111 (described below), event framework 110 (described below) and/or the sever capture analyzer engine 111 to provide camera-based portal content security for client devices. In these implementations, the user configuration 116 can also be used to provide predetermined hover data to the EPS 102 content displayed by the client application 146 (described below).

The content provider manager 108 can be any application, program, module, process, or other software that may execute, change, delete, generate, or otherwise manage content associated with the EPS 102, a content provider (not illustrated), and/or a particular client 140. For example, the content provider manager 108 can manage business process-related content on the EPS 102 and/or the client 140 in response to a received request from the client 140. For example, the content provider manager 108 may be a portal application, a business application, and/or other suitable application consistent with this disclosure. A content provider may be, for example, applications and data on the EPS 102 and/or external services, business applications, business application servers, databases, RSS feeds, document servers, web servers, streaming servers, caching servers, or other suitable content sources. In some implementations, the content provider manager 108 allows connections to various content providers, queries the content provider with regards to provided content, and enables a user to view, add, edit, and/or delete content associated with the EPS 102. The content provider manager 108 may interact with the SCAE 111 to determine if certain security criteria are satisfied for granting access to confidential content.

In some implementations, the content provider manager 108 can use content provider manager data (not illustrated) or other above-describe data stored in memory 107, for example user configuration data 116, to perform tasks associated with the EPS 102 or other components of the example distributed computing system 100. Content provider manager data may include any type of data associated with and/or used by the content provider manager 108, including content provider locations, addresses, storage specifications, content lists, access requirements, or other suitable data. For example, for a database content provider, the content provider manager data may include the server Internet Protocol (IP) address, Uniform Resource Locator (URL), access permission requirements, data download speed specifications, etc. Once a particular content provider manager 108 is launched, a client 140 may interactively process a task, event, or other information associated with the EPS 102 using content provided by the particular content provider manager 108.

Additionally, a particular content provider manager 108 may operate in response to and in connection with at least one request received from other content provider managers 108, including a content provider manager 108 associated with another EPS 102. In some implementations, the content provider manager 108 can be and/or include a web browser. In some implementations, each content provider manager 108 can represent a network-based application accessed and executed using the network 130 (e.g., through the Internet, or using at least one cloud-based service associated with the content provider manager 108). For example, a portion of a particular content provider manager 108 may be a Web service associated with the content provider manager 108 that is remotely called, while another portion of the content provider manager 108 may be an interface object or agent bundled for processing at a remote client 140. Moreover, any or all of a particular content provider manager 108 may be a child or sub-module of another software module or enterprise application (not illustrated) without departing from the scope of this disclosure. Still further, portions of the particular content provider manager 108 may be executed or accessed by a user working directly at the EPS 102, as well as remotely at a corresponding client 140.

The SCAE 111 provides a camera-based portal content security mechanism to the content provider manager 108 SCAE based on the image data captured using the camera 149 of the client 140 to determine if any content security procedures (e.g., obscuring confidential data) need to be engaged. For example, the SCAE 111 can analyze image data that includes image information of one or more EP content viewers and determine if the camera-based portal security mechanism needs be engaged, who the EP content viewers are, how many viewers there are, what particular location the client device is at, etc. An authorized user may access the EPS 102 from the client 140 and request EP content 115. The content provider manager 108 can handle the request and determine whether the requested content is protected by camera-based security by analyzing properties of requested content's associated content object 114 and/or properties directly associated with the content. If the requested content is protected by a camera-based portal content security mechanism, the EPS 102 requests an image or a video clip from the client 140 camera. The client 140 may then capture the image or video clip, and preprocess the data to identify whether there is more than one viewer using the client 140. If more than one viewer is detected, the image or video clip data can be sent to the SCAE 111 for analysis. The analysis can include, for example, confirmation of one or more viewers. Based on the SCAE 111 analysis, the content provider manager 108 can send instructions to the client 140 to hide confidential content associated with the request to client device 140.

The illustrated example distributed computing system 100 also includes a client 140. The client 140 may be any computing device operable to connect to or communicate with at least the EPS 102 using the network 130. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request, view, edit, and or delete content on the client 140 as well as to interact with the client 140, including through the use of a camera 149. In some implementations, the client application 146 can be and/or include a web browser. In some implementations, the client-application 146 can use parameters, metadata, and other information received at launch to access a particular set of data from the EPS 102. Once a particular client application 146 is launched, a user may interactively process a task, event, or other information associated with the EPS 102. Further, although illustrated as a single client application 146, the client application 146 may be implemented as multiple client applications in the client 140. In some implementations, the client application 146 may act as a GUI interface for the content provider manager 108 and/or other components of EPS 102 and/or other components of the example distributed computing environment 100.

In some implementations, the client application 146 works with a client capture analyzer engine (CCAE) 147 to determine whether received content is to be displayed or obscured on the client 140. For example, if the CCAE 147 determines that there is more than one viewer in the camera 149's field-of-view, it can instruct the client application 146 to obscure indicated confidential information and instruct the camera to retrieve and send image data to the EPS 102.

The CCAE 147 can be any application, program, module, process, or other software that may execute, change, delete, generate, or otherwise manage information associated with a particular client 140. Specifically, the CCAE 147 is an application providing functionality for receiving image data from a camera associated with a client 140 when the camera-based portal content security mechanism is engaged for certain confidential content.

In some implementations, the CCAE 147 can also perform pre-processing functions on the received image data (e.g., processing the image data prior to sending the data to the SCAE 111 on the EPS 102). In some implementations, the pre-processed data can be used on the client 140 and/or the EPS 102 to enhance performance of the client application 146 and/or the EPS 102. In some implementations, the EPS 102 sends requests for image data and/or indications to the client 140 that image data is required when the EP/EPS 102 user's content request involves confidential content indicated as protected by a camera-based portal content security mechanism. The CCAE 147 can respond to the EPS 102's request/indications by initiating the camera 149. A preliminary processing of the captured image data can be performed by the CCAE 147 to determine whether more than one viewer is detected. In some implementations, the CCAE 147 can perform a calibration operation on the camera 149. For example, the user can record a series of self-reference images at various face angles and in different surroundings to allow the CCAE 147 to identify the user with high accuracy. The reference images may enable the CCAE 147 to record/analyze key features of the user's facial characteristics (e.g., distances between eyes, nose mouth, etc.—facial recognition nodal points) and to use the recorded/analyzed key features to contrast other unwanted features, such as additional eyes, corrective lenses, camera lenses, etc. In some implementations, the CCAE 147 can perform a calibration operation in partnership with the client application 146. The CCAE 147 may be a client application 146 and/or other suitable application consistent with this disclosure. In some implementations, the SCAE 111 and/or the CCAE 147 may wholly or partially perform the same operations and/or other operations depending, at least in part, upon whether executing upon the client 140 or the EPS 102.

Additionally, a particular CCAE 147 may operate in response to and in connection with at least one request received from other CCAEs 147, including a CCAE 147 associated with another client 140. In some implementations, the CCAE 147 can include a web browser. In some implementations, each CCAE 147 can represent a network-based application accessed and executed using the network 130 (e.g., through the Internet, or using at least one cloud-based service associated with the CCAE 147). For example, a portion of a particular CCAE 147 may be a Web service associated with the CCAE 147 that is remotely called, while another portion of the CCAE 147 may be an interface object or agent bundled for processing at a remote client 140. Moreover, any or all of a particular CCAE 147 may be a child or sub-module of another software module or enterprise application (not illustrated) without departing from the scope of this disclosure. Still further, portions of the particular CCAE 147 may be executed or accessed by a user working directly at the client 140, as well as remotely at a corresponding client 140.

Camera 149 is operable to capture image of general viewers external to client 140. In some implementations, camera 149 can use a lens assembly to focus light onto an electronic image sensor and digitally record image information into memory 148 in various digital file formats. For example, digital file formats used to record the image information may be JPG, GIF, BMP, TIFF, PNG, AVI, DV, MPEG, MOV, WMV, RAW, or other suitable digital file format. In some implementations, the electronic image sensor can be a charge coupled device (CCD), an active pixel sensor (CMOS), or other suitable electronic image sensor. Camera 149 may provide a live preview of the external image source to be photographed. Camera 149 may also provide optical and/or digital zoom functionality and panoramic images in both two and three dimensions. In other implementations, the recorded image information can be both still and video with sound.

Camera 149 can capture image data of a particular one or more EP content viewer facing the display of the client 140 (e.g., using a front-facing camera). For example, the camera 149 can be a wide angle (e.g., an angle-of-view being larger than 90 degrees) camera embedded in the front frame of the client device 140. The field-of-view of the camera 149 may cover a reasonable area behind and to the sides of the location of the EP content viewer when the EP content viewer is viewing the display or GUI 142 on the client device 140. In some implementations, the field-of-view of the camera 149 may be tailored with the display on the client device 140 to allow for visibility limited to viewing within the field of view (e.g., with a polarized display, special eyewear, light, etc.).

In some implementations, image data recorded by camera 149 may also be transferred over network 130 to a remote data storage location (not illustrated) instead of being stored in memory 148. Although illustrated as integral to client 140, camera 149 may also be physically or communicably connected to client 140. For example, camera 149 may be inserted into or connected to (e.g., by a cable, wireless connection, etc.) an interface port (not illustrated) on client 140. While the client 140 is illustrated as containing a single camera 149, alternative implementations of client 140 may include any number of cameras 149 in any orientation/configuration and with any field-of-view suitable to the purposes of the example distributed computing system and particularly the requirements to protect confidential EP content.

The illustrated client 140 is intended to encompass any computing device such as a desktop computer 140a, laptop/notebook computer 140b, wireless data port, smart phone 140d, personal data assistant (PDA), tablet computing device 140c, one or more processors within these devices, or any other suitable processing device. For example, the client 140 may comprise a computer that includes a camera, an input device, such as a keypad, touch screen, or other device that can accept user information, and an output device that conveys information associated with the operation of the EPS 102 or the client 140 itself, including digital data, visual information, or a GUI 142, as shown with respect to the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the EPS 102 as well as other systems (not illustrated) communicably coupled to the network 130. The interface 152 may also be consistent with the above-described interface 104 of the EPS 102 or other interfaces within the example distributed computing system 100. The processor 144 may be consistent with the above-described processor 106 of the EPS 102 or other processors within the example distributed computing system 100. Specifically, the processor 144 executes instructions and manipulates data to perform the operations of the client 140, including the functionality required to send requests to the EPS 102 and to receive and process responses from the EPS 102. The memory 148 may be consistent with the above-described memory 107 of the EPS 102 or other memories within the example distributed computing system 100 but storing objects and/or data associated with the purposes of the client 140. Memory 148 is also shown to contain user configuration 150. User configuration 150 may be consistent with the above-described user configuration 116 but containing data associated specifically with the purposes of the client 140. In some implementations, user configuration 150 may be kept wholly and/or partially consistent with user configuration 116 by the EPS 102 and/or the client 140.

Further, the illustrated client 140 includes a GUI 142. The GUI 142 interfaces with at least a portion of the example distributed computing system 100 for any suitable purpose, including generating a visual representation of a web browser. The GUI 142 may be used to view and navigate various web pages located both internally and externally to the EPS 102 as well as to view both non-confidential and confidential portal content in any format. In particular, the GUI 142 may be used to perform functions for providing a camera-based portal content security for client devices.

There may be any number of clients 140 associated with, or external to, the example distributed computing system 100. For example, while the illustrated example distributed computing system 100 includes one client 140 communicably coupled to the EPS 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

Figure 2:
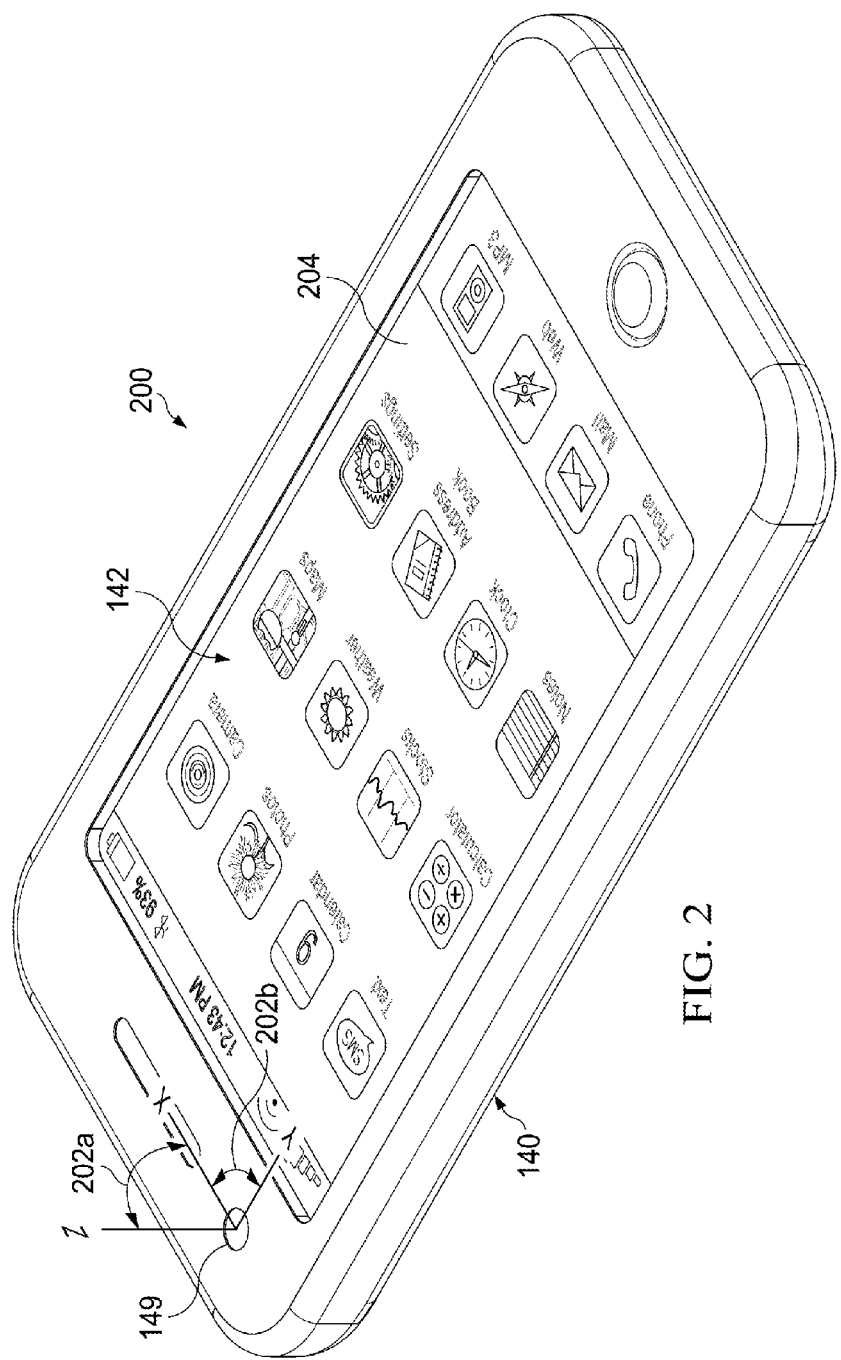
FIG. 2 is a perspective view illustrating an example configuration of an example client device configuration according to one implementation.

FIG. 2 is a perspective view illustrating an example configuration 200 of a client 140 according to one implementation. Although illustrated as a mobile-type telephone, as described above, the illustrated client 140 is intended to encompass any computing device. The GUI 142 is used by a portal content viewer to view portal content, both non-confidential and/or confidential. The illustrated camera 149 is able to detect image data at and above the surface of a display 204 rendering the GUI 142 as well as above and to the sides of the display 204. The image detection is capable of occurring, for example, along the angles illustrated by 202a and 202b. In this implementation, camera 149a performs image detection to determine whether one or multiple viewers are viewing the portal content displayed on the GUI 142 as well as normal camera functions for the mobile device, for example taking pictures, recording video, and other suitable functions.

Figure 3A:
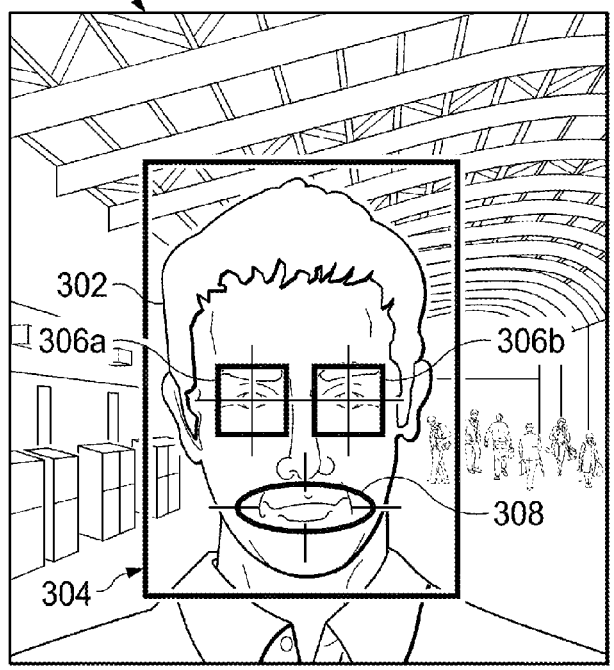
FIGS. 3A-3B illustrate example client camera views of portal content viewers.
Figure 3B:
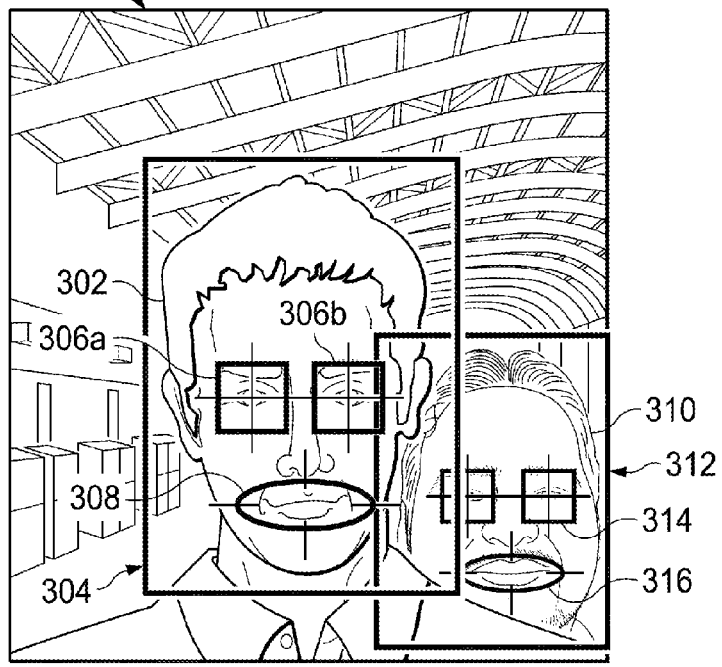

FIGS. 3A-3B illustrate example client camera views 300a/300b of portal content viewers. The example client camera views 300a/300b may be captured by a viewer-facing (front) camera 149 as described in FIGS. 1 and 2. In FIG. 3A, the example client camera view 300a shows a captured image of a viewer 302 operating/viewing a client device with a viewer facing camera in a public environment. The captured image is processed at the client device 140 for facial recognition by the CCAE 147. For example, the fact that a general "face" is detected can be indicated in the captured image data by a recognition box 304 or other suitable indication. In some implementations, geometric features of the face of the viewer 302 can be measured and/or identified for further use. For example the eyes 306a/306b can each be recognized by the CCAE 147, as well as the mouth 308. Other features could include cheek bones, forehead, hair style, and/or other suitable features. In some implementations, the CCAE 147 can analyze a distance relationship (e.g., a ratio) between identified geometric facial features or perform other suitable processing. In some implementations, the identity of the viewer can be determined based upon the processing or other biometric data available to the client device 140 and or the EPS 102. In some implementations, image processing can be performed by the CCAE 147 and/or the SCAE 111 depending upon whether the client 140 or the ESP 102 is configured to perform image processing. In some implementations, the viewer 302 can be allowed to capture a "baseline" and/or calibrated image to increase recognition accuracy and efficiency. For example, the camera 149 can capture an image of the viewer 302 similar to the example client camera view 300a and features of the viewer 302 can be used as a reference for comparison to quickly identify the viewer 302. In some implementations, viewing instruments can also be detected, such as eye glasses, cameras, etc.

In FIG. 3B, the client camera 149 view 300b includes an additional viewer 310 behind and to the side of the viewer 302. The additional viewer 310 may be wholly and/or partially included in the client camera view 300b. For example, viewer 310 may only have part of their face, an eye 314, etc. in the client camera view 300b. In addition to detecting the presence of viewer 310, the client camera view 300b can also be used to identify facial features and/or the identity of the second viewer 310. Upon detection of the second viewer, the CCAE 147 and/or the SCAE 111 can provide instructions or signals to the client 140 and or EPS 102 to obscure any confidential portal content displayed on the client 140.

Figure 4A:
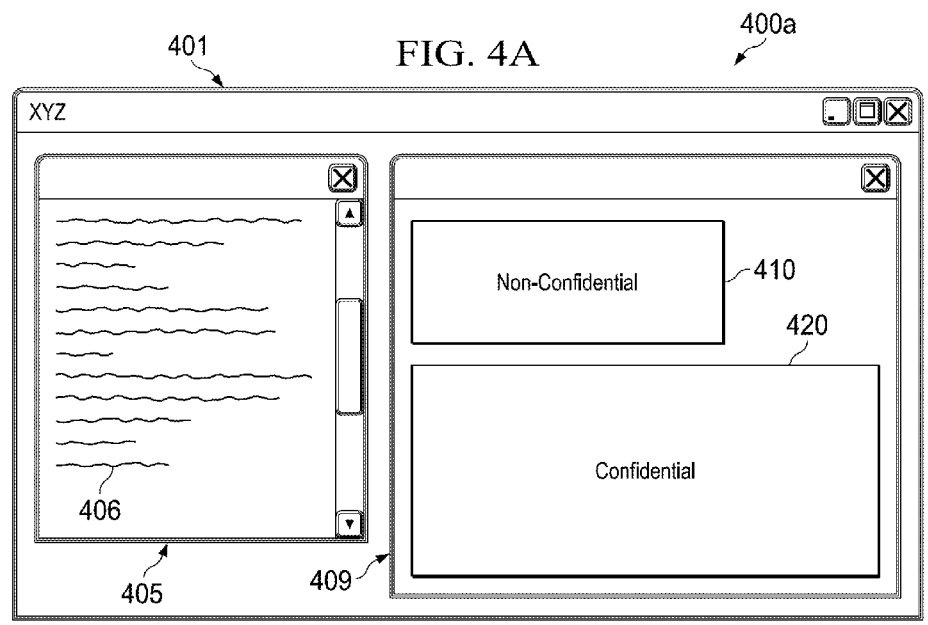
FIGS. 4A-4B illustrate example graphical user interfaces (GUIs) and the visibility of displayed non-confidential and confidential portal content.
Figure 4B:
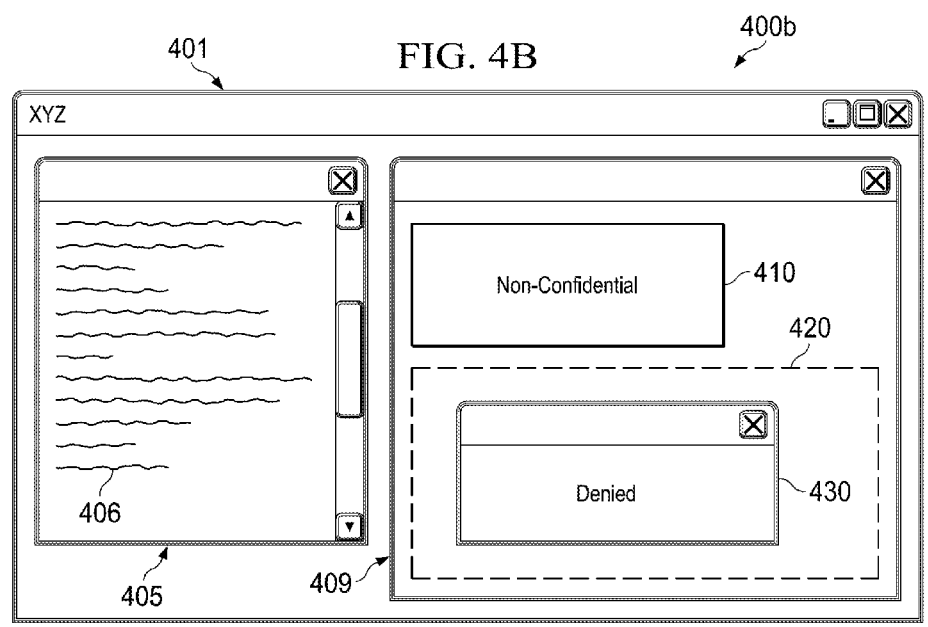

FIGS. 4A-4B illustrate example GUIs 400a/400b and the visibility of displayed non-confidential and confidential portal content. Turning first to FIG. 4A, the GUI 400a illustrates a window 401 that enables viewing of example portal content listed in a content table 405. In this example, a particular topic 406 is selected in the content table 405 and associated portal content displayed in a pop-up window 409. The portal content associated with the selected topic 406 may include non-confidential portal content 410 as well as confidential portal content 420 that is associated with a camera-based portal content security mechanism. Both of the non-confidential content 410 and the confidential content 420 can be displayed within the pop-up window 409 or anywhere within window 401. Upon a determination that only an allowed number of viewers are viewing the content, both the non-confidential content 410 and the confidential content 420 are displayed in the GUI 400a.

In FIG. 4B, the GUI 400b illustrates the window 401 where additional viewers or viewing instruments are detected. For preventing security breach, the confidential content 420 will be obscured and a warning dialog 430 obscuring the confidential portal content is presented to indicate that access to the confidential content is denied. In some implementations, the camera-based portal content security mechanism may be overridden by additional authentication measures, as further discussed with respect to FIG. 5.

FIG. 5 illustrates an example GUI 500 for overriding an obscuring of confidential portal content. A viewer may indicate a desire to override the obscuring warning dialog 430. For example, the viewer can select the warning dialog 430 with pointing cursor or object which displays an authorization dialog 530. The authentication dialog 530 allows the viewer to override the obscured confidential content 420 with a name/password combination or other suitable authentication methods. In some implementations, the authentication window 530 can request biometric data, including a facial image, fingerprint, or the like. Once the viewer overrides the warning dialog 430, the obscured confidential portal content is rendered accessible to the viewer.

In some implementations, an identified second viewer, for example viewer 310 described in FIG. 3B, can be determined to have sufficient administrative privileges, role, etc. to view the confidential portal content 420 displayed on the client 140. In these instances, the confidential portal content 420 can be displayed without any obscuring action/method or a warning dialog 530 and/or other obscuring action/method can be used to initially obscure the confidential portal content 420 and requiring at least one of the authorized viewers to override the obscuring action. In some instances, a note, comment, etc. (not illustrated) can be associated with the warning dialog and/or obscuring action/method notifying that the second detected viewer is an authorized viewer. In some instances, the second detected viewer can be specifically identified by name, role, department, and/or other suitable information.

Figure 6A:
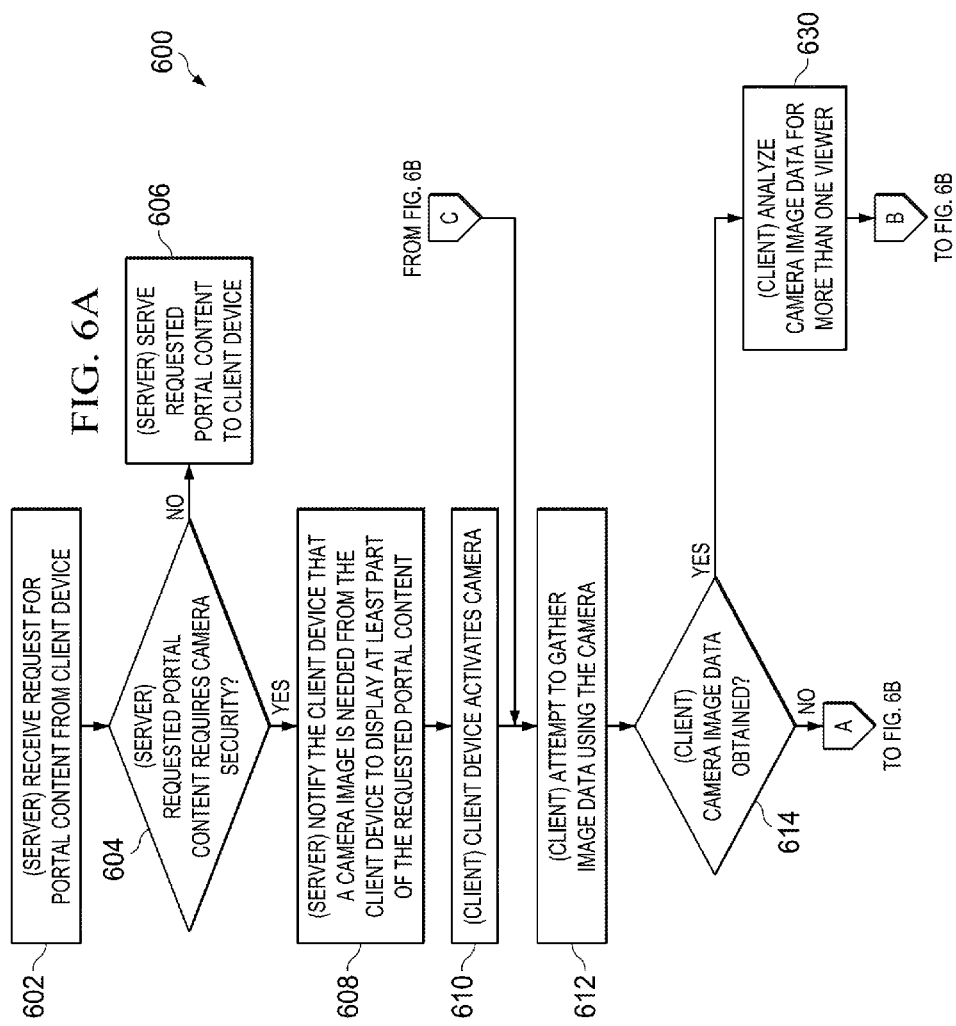
FIGS. 6A-6B illustrate a flow chart of an example method for providing a camera-based portal content security mechanism for client devices.
Figure 6B:
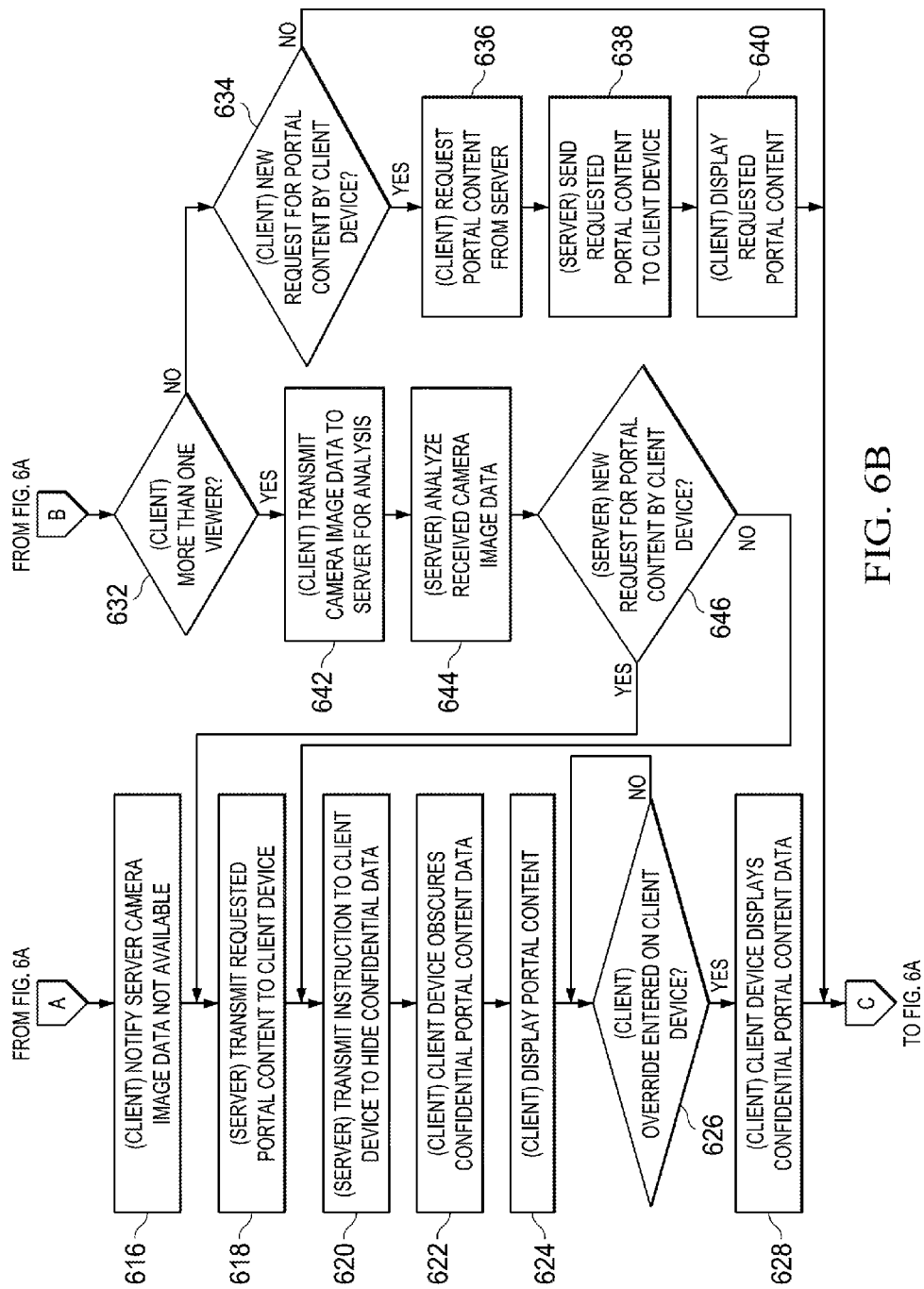

FIGS. 6A-6B illustrate a flow chart of an example method 600 for providing a camera-based portal content security mechanism for client devices. For clarity of presentation, the description that follows generally describes method 600 in the context of FIGS. 1, 2, 3A-3B, 4A-4B, and 5. However, it will be understood that method 600 may be performed, for example, by any other suitable system, environment, software, and hardware, or a combination of systems, environments, software, and hardware as appropriate.

Referring to FIG. 6A, at 602, the EPS receives a request for portal content from a client device. From 602, method 600 proceeds to 603.

At 604, a determination is made whether the requested portal content requires camera security. In some implementations, the determination that the requested portal content requires camera security includes identifying an object attribute classifying the portal content as confidential, wherein the object attribute invoking the request for the camera image from the client device. If at 604, it is determined that the requested portal content does not require camera security, method 600 proceeds to 606. If at 604, it is determined that the requested portal content does require camera security, method 600 proceeds to 608.

At 606, the EPS serves the requested portal content to the requesting client device. In some implementations, the requested portal content can contain confidential information that does not require camera security. After 606, method 600 stops.

At 608, the client device that a camera image is needed from the client device as a prerequisite to display at least part of the requested portal content. The camera image is needed to allow processing to be performed on the camera image to determine if, for example, there is more than one viewer of the requested portal content. From 608, method 600 proceeds to 610.

At 610, the client device activates a camera to gather image data. In some implementations, if the camera cannot be activated, an error message can be sent to the EPS of this fact. From 610, method 600 proceeds to 612.

At 612, the client device attempts to gather image data using the camera. From 612, method 600 proceeds to 614.

At 614, a determination is made whether the client device was able to obtain image data. If at 614 it is determined that the client device was able to obtain image data, method 600 proceeds to 630. If at 614 it is determined that the client device was not able to obtain image data, method 600 proceeds to 616 illustrated in FIG. 6B.

At 616, the EPS is notified that camera image data is not available. From 616, method 600 proceeds to 618.

At 618, the EPS transmits the requested portal content to the client device. In some implementations, the EPS does not transmit the requested portal content to the client device or only the non-confidential portal content. From 618, method 600 proceeds to 620.

At 620, the EPS transmits an instruction to the client device to hide confidential data. From 620, method 600 proceeds to 622.

At 622, the client device obscures confidential portal content data in the received portal content because camera image data was not able to be obtained. From 622, method 600 proceeds to 624.

At 624, the client device displays portal content it is permitted to display. In some implementations, the obscured data is displayed as obscured with a warning dialog or other suitable method to obscure confidential portal content. In some implementations, the obscured confidential portal content can be overridden regardless of the inability to obtain camera image data. From 624, method 600 proceeds to 626.

At 626, a determination is made whether an override was entered on the client device to display obscured portal content. If at 626 it is determined that an override was not entered on the client device to display obscured portal content, method 600 proceeds to 626. If at 626 it is determined that an override was entered on the client device to display obscured portal content, method 600 proceeds to 628.

At 628, the client device displays confidential portal content data. From 628, method 600 proceeds to 612 illustrated in FIG. 6A.

At 630, the client device analyzes camera image data for more than one viewer. From 630, method 600 proceeds to 632 illustrated in FIG. 6B.

At 632, a determination is made whether more than one viewer is detected. If at 632, it is determined that more than one viewer is detected, method 600 proceeds to 642. If at 632 it is determined that more than one viewer is not detected, method 600 proceeds to 634.

At 642, the camera image data is transmitted to the EPS for analysis. From 642, method 600 proceeds to 644.

At 644, the received camera image data is analyzed. In some implementations, the analysis can be for multiple viewers, viewer identification, or other suitable data consistent with this disclosure. From 644, method 600 proceeds to 646.

At 646, a determination is made whether the request for portal content is a new request. If at 646, it is determined that the request for portal content is a new request, method 600 proceeds to 618. If at 646, it is determined that the request for portal content is not a new request, method 600 proceeds to 620.

At 634, a determination is made whether the request for portal content is a new request. If at 634, it is determined that the request for portal content is not a new request, method 600 proceeds to 612 illustrated in FIG. 6A. If at 634, it is determined that the request for portal content is a new request, method 600 proceeds to 636.

At 636, portal content is requested from the EPS. From 636, method 600 proceeds to 638.

At 638, requested portal content is sent to the client device. From 638, method 600 proceeds to 640.

At 640, requested portal content is displayed on the client device. From 640, method 600 proceeds to 612 illustrated in FIG. 6A.

Although the disclosure describes the example distributed computing system 100 in terms of an EP, those skilled in the art will recognize that the disclosed subject matter could apply to any type of content delivery system, including a content delivery system that is not an EP. The disclosure is not meant to limit the applicability to other content delivery systems in any way.

In some implementation, the example distributed computing system 100 and more particularly the SCAE 111 and/or CCAE 147 can also specifically identify one or more viewers in received image data containing one or more viewers. The identification could be used to determine whether the identified viewers (primary and/or secondary) are authorized to view EP content. If so, in some implementation, any confidential content will not be obscured even if more than one viewer is detected and/or can be only partially obscured depending upon a determined authorization level of each the identified viewer.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touch-screen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   receiving a request for portal content from a client device;
   determining that the requested portal content held by a context object requires a camera security operation, wherein the determination includes identifying an object attribute of the context object, wherein the object attribute classifies the portal content as confidential, and wherein the object attribute invokes sending a request for a camera image to the client device;
   sending the request for a camera image to the client device, wherein the request for a camera image places the client device on notice that a camera image is needed as a prerequisite to display at least part of the requested portal content;
   receiving a preprocessed camera image from the client device, the preprocessing having analyzed the camera image for more than one viewer; and
   analyzing, by operation of a computer, the received preprocessed camera image for more than one viewer.

2. The computer-implemented method of claim 1, further comprising:
   activating the client device camera;
   attempting to take a camera image using the client device camera; and
   determining whether the camera image was obtained.

3. The computer-implemented method of claim 1, further comprising, upon a determination that more than one viewer is detected in the analyzed camera image:
   transmitting the requested portal content to the client device;
   transmitting an instruction to the client device to obscure a confidential portion of the requested portal content; and
   obscuring the confidential portion of the requested portal content.

4. The computer-implemented method of claim 1, further comprising, upon a determination that only one viewer is detected in the analyzed camera image:
   serving the requested portal content to the client device; and
   displaying the served requested portal content on the client device.

5. The computer-implemented method of claim 3, further comprising providing a graphical user interface to allow additional input of credentials to release the confidential portion of the requested portal content from obscuration.

6. The computer-implemented method of claim 5, wherein the additional input of credentials comprises at least one of a password and a fingerprint.

7. A non-transitory, computer-readable medium storing computer instructions executable by a data processing apparatus to perform operations comprising:
   receiving a request for portal content from a client device;
   determining that the requested portal content held by a context object requires a camera security operation, wherein the determination includes identifying an object attribute of the context object, wherein the object attribute classifies the portal content as confidential, and wherein the object attribute invokes sending a request for a camera image to the client device;

sending the request for a camera image to the client device, wherein the request for a camera image places the client device on notice that a camera image is needed as a prerequisite to display at least part of the requested portal content;

receiving a preprocessed camera image from the client device, the preprocessing having analyzed the camera image for more than one viewer; and analyzing the received preprocessed camera image for more than one viewer.

8. The computer-readable medium of claim 7, further comprising operations:

activating the client device camera;

attempting to take a camera image using the client device camera; and determining whether the camera image was obtained.

9. The computer-readable medium of claim 7, further comprising operations, upon a determination that more than one viewer is detected in the analyzed camera image:

transmitting the requested portal content to the client device;

transmitting an instruction to the client device to obscure a confidential portion of the requested portal content; and obscuring the confidential portion of the requested portal content.

10. The computer-readable medium of claim 7, further comprising operations, upon a determination that only one viewer is detected in the analyzed camera image:

serving the requested portal content to the client device; and displaying the served requested portal content on the client device.

11. The computer-readable medium of claim 9, further comprising operations providing a graphical user interface to allow additional input of credentials to release the confidential portion of the requested portal content from obscuration.

12. The computer-readable medium of claim 11, wherein the additional input of credentials comprises at least one of a password and a fingerprint.

13. A system, comprising:

at least one computer configured to:

receive a request for portal content from a client device;

determine that the requested portal content held by a context object requires a camera security operation, wherein the determination includes identifying an object attribute of the context object, wherein the object attribute classifies the portal content as confidential, and wherein the object attribute invokes sending a request for a camera image to the client device;

send the request for a camera image to the client device, wherein the request for a camera image places the client device on notice that a camera image is needed as a prerequisite to display at least part of the requested portal content;

receive a preprocessed camera image from the client device, the preprocessing having analyzed the camera image for more than one viewer; and analyze the received preprocessed camera image for more than one viewer.

14. The system of claim 13, further configured to:

activate the client device camera;

attempt to take a camera image using the client device camera; and determine whether the camera image was obtained.

15. The system of claim 13, further configured, upon a determination that more than one viewer is detected in the analyzed camera image, to:

transmit the requested portal content to the client device;

transmit an instruction to the client device to obscure a confidential portion of the requested portal content; and obscure the confidential portion of the requested portal content.

16. The system of claim 13, further configured, upon a determination that only one viewer is detected in the analyzed camera image, to:

serve the requested portal content to the client device; and display the served requested portal content on the client device.

17. The system of claim 15, further configured to provide a graphical user interface to allow additional input of credentials to release the confidential portion of the requested portal content from obscuration.

18. The system of claim 17, wherein the additional input of credentials comprises at least one of a password and a fingerprint.

* * * * *